United States Patent [19]

Stong et al.

[11] Patent Number: 4,602,067
[45] Date of Patent: Jul. 22, 1986

[54] HIGH TEMPERATURE DRILLING FLUIDS

[75] Inventors: Randel E. Stong, Gales Ferry; Stanley W. Walinsky, Mystic, both of Conn.

[73] Assignee: Pfizer Inc., New York, N.Y.

[21] Appl. No.: 716,908

[22] Filed: Mar. 28, 1985

Related U.S. Application Data

[63] Continuation-in-part of Ser. No. 612,280, May 21, 1984, Pat. No. 4,566,978.

[51] Int. Cl.$^4$ ............................................. C08F 8/32
[52] U.S. Cl. ........................ 525/327.4; 525/327.6; 525/378; 525/379; 526/372; 252/8.5 A; 525/369
[58] Field of Search ................ 525/327.4, 327.6; 526/372

[56] References Cited

U.S. PATENT DOCUMENTS

| | | | |
|---|---|---|---|
| 3,332,872 | 7/1967 | Oakes | 252/8.5 |
| 3,730,900 | 5/1973 | Perricone et al. | 252/8.5 C |
| 3,764,530 | 10/1973 | Burland et al. | 252/8.5 C |
| 4,065,607 | 12/1977 | Kurowsky | 526/15 |
| 4,223,120 | 9/1980 | Kurowsky | 526/208 |
| 4,298,513 | 11/1981 | Distler et al. | 526/307.6 |
| 4,381,367 | 4/1983 | von Bonin et al. | 526/272 |
| 4,390,670 | 6/1983 | Walinsky | 526/79 |

*Primary Examiner*—Joseph L. Schofer
*Assistant Examiner*—Bernard Lipman
*Attorney, Agent, or Firm*—Charles J. Knuth; Peter C. Richardson; James H. Monroe

[57] ABSTRACT

An aqueous drilling fluid suitable for high-temperature use comprising a water base, clay suspended in said base and from about 0.01–25 pounds per barrel total composition of a hydrolyzed terpolymer of maleic anhydride, styrene and a third monomer selected from acrylamide, methacrylamide, acrylic acid or methacrylic acid, the molar ratio of maleic anhydride to styrene to said third monomer being from about 30:10:60 to 50:40:10, and the alkali metal, ammonium and lower aliphatic amine salts thereof, the weight-average molecular weight of said hydrolyzed terpolymer being from about 500–10,000. An improved drilling process wherein such fluids remain flowable at elevated temperatures is also disclosed.

4 Claims, No Drawings

HIGH TEMPERATURE DRILLING FLUIDS

CROSS REFERENCE TO RELATED APPLICATIONS

This application is a continuation-in-part of our co-pending application Ser. No. 612,280 filed May 21, 1984, now U.S. Pat. No. 4,566,978.

BACKGROUND OF THE INVENTION

Drilling fluids are used in wells drilled by the rotary method. In that process, a fluid is generally circulated downward through a hollow drill pipe, whereupon it issues through ports in the bit attached to the lower end of the drill pipe, and rises to the top of the well in the space between the drill pipe and the walls or casing of the hole. The fluid is cleaned of any cuttings or drilling debris which it has brought to the surface, and then recirculated into the drill pipe. The bore hole normally is maintained full of drilling fluid during drilling. The fluid functions to raise cuttings, to keep formation fluids from issuing into the hole by exerting a higher pressure hydrostatically, to cool and lubricate the bit and drill string, to buoy the drill pipe, and to bring formation samples to the surface for inspection. Accordingly, the fluid must have a suitable density, 2.0 g/cc or higher often being necessary; it must have proper rheological characteristics, in particular an apparent viscosity at high rates of shear of ten or twenty times that of water and a low but appreciable gel strength; however, it must be subject to thixotropic increase upon standing, and be able to resist filtration into a porous medium.

The first fluids consisted simply of clay in water, however, clays alone rarely permit fluid densities greater than about 1.25, so that finely ground, inert materials of high intrinsic density were later introduced for deeper drilling with its higher hydrostatic pressures. Barite, hematite, celestite, witherite, and other minerals have been used.

Water-base fluids are subject to increase in consistency from a number of causes, for example, an increased solids content from formation cuttings and salts and thermal degradation of the thinners. Large quantities of polyphosphates were formerly used in combatting thickening in drilling fluids, particularly from flocculation. Polyphosphates are not well suited, however, to drilling fluids used at extreme depths because the higher bottom hole temperatures rapidly bring about hydrolytic degradation to orthophosphates. Of growing importance, therefore, is the use of organic thinners, the most widely used of which are lignite and lignosulfonate derivatives, especially ferrochrome lignosulfonate. Although more stable than polyphosphates, lignite and lignosulfonate also have use limitations; i.e., they require high pH, degrade above 375° F., and generally require high use levels.

Polymers have also been added to drilling fluids for improving various properties. For example, U.S. Pat. No. 3,332,872 teaches the use of a copolymer of styrene and maleic anhydride to control viscosity of drilling fluids. U.S. Pat. No. 3,730,900 employs styrene sulfonic acidmaleic anhydride copolymers as stabilizers in drilling fluids and U.S. Pat. No. 3,764,530 employs non-halogen containing acrylic acid polymers to reduce thermal degradation in these fluids.

Such polymers have also found use as scale control agents. For example, U.S. Pat. No. 4,065,607 and U.S. Pat. No. 4,223,120 teach the use of terpolymers of maleic anhydride, acrylamide and a monomer such as octene or styrene and U.S. Pat. No. 4,390,670 teaches the use of acrylate-maleate copolymers.

SUMMARY OF THE INVENTION

The present invention comprises an aqueous drilling fluid suitable for high-temperature use comprising a water base, clay suspended in said base and from about 0.01–25 pounds per barrel total composition of a hydrolysed terpolymer of maleic anhydride, styrene and a third monomer selected from acrylamide, methacrylamide, acrylic acid and methacrylic acid, the molar ratio of maleic anhydride to styrene to said third monomer being from about 30:10:60 to 50:40:10, and the alkali metal, ammonium and lower aliphatic amine salts thereof, the weight-average molecular weight of said hydrolyzed terpolymer being from about 500–10,000.

The fluid is preferred wherein said third monomer is acrylamide or acrylic acid. The fluid is also preferred wherein, when said third monomer is acrylic acid or methacrylic acid, the partial amide form of said terpolymer is employed.

The present invention further comprises an aqueous drilling fluid suitable for high-temperature use comprising a water base, clay suspended in said base and from about 0.01–25 pounds per barrel total composition of a hydrolyzed copolymer of maleic anhydride and a second monomer selected from acrylamide, methacrylamide, acrylic acid, and methacrylic acid, the molar ratio of maleic anhydride to the second monomer being from about 25:75 to 75:25, and the alkali metal, ammonium and lower aliphatic amide salts thereof, the weight-average molecular weight of hydrolyzed copolymer being from about 500–10,000. The fluid is preferred wherein the second monomer is acrylamide.

Another feature of the present invention is the process of drilling a well wherein a clay-containing drilling fluid is employed, having the improvement which comprises maintaining the fluid in a flowable state at elevated temperatures with or without lignosulfonate being present by incorporating therein from about 0.01–25 pounds per barrel total composition of a hydrolyzed terpolymer of maleic anhydride, styrene and a third monomer selected from acrylamide, methacrylamide, acrylic acid and methacrylic acid, the molar ratio of maleic anhydride to styrene to the third monomer being from about 30:10:60 to 50:40:10, and the alkali metal, ammonium and lower aliphatic amine salts thereof, the weight-average molecular weight of hydrolyzed terpolymer being from about 500–10,000. The process is preferred wherein the third monomer is acrylamide or acrylic acid.

A further feature of the present invention is the process of drilling a well wherein a clay-containing drilling fluid is employed, having the improvement which comprises maintaining the fluid in a flowable state at elevated temperatures by incorporating therein from about 0.01–25 pounds per barrel total composition of a hydrolyzed copolymer of maleic anhydride and a second monomer selected from acrylamide, methacrylamide, acrylic acid and methacrylic acid, the molar ratio of maleic anhydride to the second monomer being from about 25:75 to 75:25, and the alkali metal, ammonium and lower aliphatic amine salts thereof, the weight-average molecular weight of hydrolyzed copolymer being from about 500–10,000. The process is preferred wherein the second monomer is acrylamide.

A preferred feature of the invention is a partially amidated terpolymer of maleic anhydride, styrene and a third component selected from acrylic or methacylic acid where the ratio of the components is from about 30:10:60 to about 50:40:10 and wherein from about 1–42 percent of carboxylic functionality has been converted to amide functionality by treatment with ammonia, ammonium hydroxide or primary or secondary lower alkyl amines having from about 1–5 carbon atoms in each alkyl group, the weight average molecular weight of the terpolymer being from about 500–10,000. Especially preferred is the terpolymer wherein the third component is acrylic acid and wherein the treatment is with ammonium hydroxide.

A final preferred feature of this invention is a partially amidated copolymer of maleic anhydride and a second component selected from acrylic or methacrylic acid wherein the molar ratio of the components is from about 25:75 to 75:25 and wherein from about 0.5–42 percent of carboxylic functionality has been converted to amide functionality by treatment with ammonia, ammonium hydroxide or primary or secondary lower alkyl amines having from about 1–5 carbon atoms in each alkyl group, the weight average molecular weight of the copolymer being from about 500–10,000. Especially preferred is the copolymer wherein the second component is acrylic acid and wherein the treatment is with ammonium hydroxide.

DETAILED DESCRIPTION OF THE INVENTION

The hydrolyzed terpolymers and copolymers employed in preparing the drilling fluids of this invention can be prepared by known methods such as are taught in U.S. Pat. No. 4,065,607, U.S. Pat. No. 4,223,120 and U.S. Pat. No. 4,390,670. At times, the terpolymer and copolymer compositions were further modified by treatment with strong acids or caustic as described in this invention. For example, a terpolymer useful in the present invention is formed by first contacting from 30 to 50 mole percent maleic anhydride with from 1 to 21 weight percent di-t-butyl peroxide based on total monomers in an appropriate reaction solvent. The mixture is heated to the appropriate temperature and then from 10 to 40 mole percent styrene and 60 to 10 mole percent acrylamide are continuously added as separate streams to the reaction mixture, preferably at such a rate so as to complete addition within a time period of from 15 to 180 minutes. The usual addition time period is approximately 30 to 60 minutes.

To form a copolymer useful in the present invention, from 30 to 70 mole percent maleic anhydride is contacted with from 30 to 70 mole percent acrylamide or methacrylamide in the same manner as that described for the terpolymers except that the third monomer is omitted. The reaction is preferably conducted under an inert atmosphere, e.g., nitrogen. Agitation of the reaction mixture is preferably maintained throughout the course of the reaction, e.g., by stirring or sparging.

Isolation of the unhydrolyzed polymer can be accomplished by any of the standard techniques available and known to the art. The preferred method includes washing the filtered reaction material with organic solvents such as ether, tetrahydrofuran, chloroform, carbon tetrachloride and similar nonpolar, nonhydroxylic organic solvents. This will yield polymer substantially free of unreacted monomer. Normally the hydrolyzed polymer is isolated as an aqueous solution, by addition of water to the hot reaction mixture, followed by layer separation, and subsequent removal of residual solvents and monomers by azeotropic distillation.

The alkali metal, and ammonium salts of the hydrolyzed polymers can be formed by adding the alkali metal base, ammonia, ammonium hydroxide or organic amine to the water solution of the hydrolyzed terpolymer or by employing the base or acid directly to hydrolyze the unhydrolyzed terpolymer or copolymer. Subsequent removal of the water will allow isolation of the desired terpolymer or copolymer salt or it may be used directly in aqueous solution without isolation. Common alkali metal bases include sodium hydroxide, potassium hydroxide and lithium hydroxide. Common ammonium bases and amines include ammonium hydroxide, ammonia, mono-, di-, and trialkyl amines having from 1 to 5 carbon atoms in each alkyl group and morpholine. Common acids include sulfuric, hydrochloric, or phosphoric acids or sulfonic acid ion-exchange resins.

To prepare the drilling fluids of the present invention the polymers described above will be admixed with standard drilling muds, either weighted or unweighted. Generally a clay such as bentonite and a low yield clay (Rev Dust) will be added to water in a mixer and mixed thoroughly. Various additives can then be included such as sodium chloride, ferrochrome lignosulfonate, sodium hydroxide, lignite, lime dust, and if desired, a weighting agent such as barite. All of the chosen ingredients will be mixed thoroughly and the mud generally will be allowed to age at least overnight. The prepared mud will then be re-mixed under high shear, its pH will be adjusted to about 10, if needed; and from 0.01–25 pounds per barrel of one of the polymers described will be added with stirring. The pH will then be readjusted to about 10.5 with base, if needed.

The efficacy of these drilling fluids under high temperatures can be evaluated by determining the standard shear stress (dyne/cm$^2$) versus shear rate (sec$^{-1}$) plots as a function of increasing fluid temperature. These data are automatically generated by Model 50C FANN VISCOMETER. The temperature at which the mud gels or degrades is noted by a sharp increase in fluid viscosity which appears as an abrupt discontinuity in the FANN rheology plots. The mud performance data in Table 3 shows comparative fluid gelation temperatures for the polymers of this invention versus prior art thinners. One standard drilling fluid is a freshwater bentonite mud which contains the low-temperature thinner, ferrochrome lignosulfonate. The second drilling fluid which represents a more severe and more realistic high-temperature test contains a barite-weighted mud without lignosulfonate.

In the field, these drilling fluids are employed by injecting them directly into the wells which are being drilled for oil, gas, or water explorations, such as water or steam-dominated geothermal wells. The amount and type of fluid utilized will vary with well depth, pipe diameter, and geology encountered. Formation characteristics, borehole properties, drilling depth, contaminants, temperatures and pressures encountered and drilling fluid weight will influence the determination of quantities to be utilized in order to achieve the desired effect. In addition, the particular properties of the fluid produced will also influence the determination of quantities needed in the process. Because of this, it is impossible to specifically state nominal usage levels under all environments or conditions. Those skilled in the art of drilling will be able to easily determine use levels by testing samples obtained from the borehole, checking formation characteristics, monitoring mud viscosity, fluid loss and temperatures and by otherwise determining the rheological properties that will be required. Nevertheless, it can be stated that under most high temperature drilling conditions, about 0.1-10 pounds per barrel of the polymers described will be used in unweighted bentonite fluids while somewhat higher levels may be required in weighted fluids.

The examples and preparative examples to follow are illustrative and do not limit the scope of this invention as defined in the claims.

PREPARATIVE EXAMPLE 1

To a one liter, 4-neck round bottom flask equipped with a mechanical stirrer, thermometer, and reflux condenser topped with a nitrogen inlet was added xylenes (146.0 g), methyl isobutyl ketone (146.0 g), powdered maleic anhydride (83.2 g, 0.85 mole), and di-t-butyl peroxide (9.38 g, 0.06 mole). The flask was purged with nitrogen and then maintained under a nitrogen atmosphere. The mixture was heated to reflux (128°–130° C.), and then separate streams of styrene (21.6 g, 0.21 mole) and acrylamide (67.1 g, 0.94 mole) were added continuously over 1 hour. The resulting polymeric dispersion was heated at reflux for an additional 5 hours. The mixture was cooled to approximately 90° C. and hot water (365 g) was added. The mixture was reheated and maintained at reflux for 1 hour. Stirring and heating were stopped and the layers were allowed to separate. After the organic layer was decanted, the aqueous layer was reheated to reflux and residual solvent was azeotropically distilled (approximately 100 ml of distillate was removed over 2 hours).

The polymer solution was cooled to room temperature to afford 418.9 g (45.6% solids) of a dark amber solution; yield 111% based on charged monomers.

The molecular weight distribution of the hydrolyzed terpolymer was determined by high pressure liquid chromatography (HPLC) on a series of three 27.5 cm 60 A° gel permeation columns using an acetate-phosphate buffer eluent adjusted to pH 7.4 with 1N aqueous sodium hydroxide, the columns being calibrated with 1,2,3,4-butane-tetracarboxylic acid and polyacrylic acids of known molecular weight. This analysis indicated that the above terpolymer has a weight-average molecular weight of 3100 and a dispersity of 3.1.

Combustion analyses and acid values (meq $H^+/g$ active polymer using a pH=11.0 endpoint) were determined on solid samples of the isolated hydrolyzed terpolymers. In the case of aqueous polymer solutions in which the polymer is present in its free acid form (no alkali metal salts) the solution was freeze dried and then the solid polymer was analyzed for C, H, and N, as well as, Karl Fischer water determination. A weighted sample of the solid polymer was also titrated to a pH 11.0 endpoint with standardized aqueous caustic. For polymer solutions in their salt or partial salt forms, these solutions were ion-exchanged through a sulfonic acid resin and then freeze dried.

The terpolymer of example #1 contained $gN/gC=12.9\times10^{-2}$ and meq $H^+/g=8.1$ at pH=11.0).

PREPARATIVE EXAMPLE 2

The aqueous polymer solution (418.9 g, 45.6% solids) of Example 1 was heated to reflux with stirring. Once at reflux, a 50% (w/w) sodium hydroxide solution (137.5 g, 1.72 mole NaOH) was added slowly over 30 minutes. Antifoam agent (5-10 ppm) was added, and then an ammonia/water condensate (137.5 g) was distilled from the reaction over 6 hours. An amber polymer solution (pH=9.2) was obtained which contained approximately 51% solids.

Ion-exchanged polymer possessed meq $H^+/g=10.3$ at pH=11.0; $gN/gC=8.1\times10^{-2}$; Mw=3000 with dispersity of 3.2.

PREPARATIVE EXAMPLE 3

Maleic anhydride (166.4 g, 1.70 mole) and di-t-butyl peroxide (18.8 g, 0.13 mole) were added to 600 g. of methyl isobutyl ketone which was placed in a flask equipped with mechanical stirrer, reflux condenser, and a nitrogen inlet. The flask was purged and maintained under dry nitrogen while the reactants were heated to reflux. Once at reflux (124° C.), a solution of styrene (43.2 g, 0.41 mole) in glacial acrylic acid (136.1 g, 1.89 mole) was added continuously over 3.5 hours. The yellowish polymer solution was heated at reflux (117° C.) for an additional 0.75 hours and then cooled to room temperature.

To one-half (500 ml) of the above polymer solution, 0.8 liters of water was added. The resulting mixture was heated to reflux and then methyl isobutyl ketone/water azeotrope was distilled overhead. After approximately 500 ml of distillate was removed, the product was cooled to room temperature to give 416.7 g (47.3% solids; 114% yield) of a greenish-yellow, aqueous, polymer solution. (Freeze Dried terpolymer: meq $H^+/g=13.0$ at pH=11.0; Mw=5610 with D=3.5).

PREPARATIVE EXAMPLE 4

The second-half of the MIBK terpolymer solution from Example 3 was slowly added to stirred diethyl ether (1.5 liters) to precipitate the anhydride form of the terpolymer. The solid was rapidly filtered at reduced pressure and then dried in vacuo to give 160.9 g (93% yield) of white powder. The solid polymer was then slowly added at room temperature to stirred, concentrated ammonium hydroxide (1.2 liters). The hazy solution was stirred overnight and then concentrated to a solid (174.0 g) at reduced pressure. Ion-exchanged polymer: meq $H^+/g=10.9$ at pH=11.0; $gN/gC=9.2\times10^{-2}$; Mw=5610 with D=3.5).

PREPARATIVE EXAMPLE 5

The terpolymer solution of Example 1 was heated at reflux for an additional 30-48 hours. The solution was cooled to room temperature and then 300 grams of 12.5M NaOH solution was added with stirring over 5 minutes. The temperature of the polymer solution rose to approximately 70° C. during mixing. Once the addition was completed, the solution was rapidly heated to reflux and maintained at reflux for 80 minutes. The solution was cooled to give a 27% active amber terpolymer solution.

(Freeze dried polymer after ion-exchange: $gN/gC=7.1\times10^{-2}$ and meq $H^+/g=9.7$ at pH=11.0).

PREPARATIVE EXAMPLE 6

To 500 grams of a 40% (w/w) polymer solution of Example 1 was added approximately 610 ml of DOWEX 50W-X8H+ ion-exchange resin (acid form). The mixture was heated at reflux with stirring for 24 hours. The mixture was cooled to room temperature and then filtered at reduced pressure. A 40% hydrolyzed terpolymer solution was obtained.

(Freeze dried terpolymer: $gN/gC=6.7\times10^{-2}$ and meq $H^+/g=8.5$ at $pH=11.0$).

Table 1 shows sundry process variations in hydrolyzed terpolymer syntheses.

hours. The mixture was cooled to 60° C. and then suction filtered. The copolymer was washed with ether ($2\times200$ ml), filtered, and then dried in vacuo. A white solid (1113.4 g) was obtained in 110% yield.

TABLE 1
TERPOLYMER SYNTHESES

| MONOMERS (mole %) | SOLVENT (wt. %) | PROCESS DATA | | | | |
|---|---|---|---|---|---|---|
| | | di-t-Bu$_2$O$_2$ (mole %) | COMONOMER ADD TIME (HR) | POLYMERIZATION TIME (HR) | AQUEOUS HYDROLYSIS TIME (HR) | YIELD |
| 1. MAN/AAM/STY (43:47:10) | Xylenes/MIBK(1:1) (61) | 3.0 | 1.0 | 6.0 | 3.0 | 113 |
| 2. MAN/AAM/STY (43:47:10) | MIBK (62) | 3.1 | 1.0 | 6.0 | 8.0 | 109 |
| 3. MAN/AAM/STY (43:47:10) | Xylenes/MIBK(1:1) (92) | 0.5 | 1.0 | 50 | 20 | — |
| 4. MAN/AAM/STY (43:47:10) | Xylenes/MIBK(1:1) (61) | 16.0 | 1.0 | 6.0 | 13 | 104 |
| 5. MAN/AAM/STY (37:42:20) | Xylenes/MIBK(1:1) | 3.1 | 1.0 | 6.0 | 7.0 | 104 |
| 6. MAN/AAM/STY (30:40:30) | MIBK (62) | 3.1 | 1.0 | 6.0 | 2.0 | 119 |
| 7. MAN/AAM/STY (30:30:40) | MIBK (62) | 3.1 | 1.0 | 2.0 | 2.0 | — |
| 8. MAN/AAC/STY (50:30:20) | MIBK (61) | 3.8 | 3.5 | 5.5 | 5.0 | 104 |
| 9. MAN/AAC/STY (35:35:30) | MIBK (61) | 3.8 | 3.5 | 5.5 | 6.0 | 100 |

| MONOMERS (mole %) | CHARACTERIZATION DATA | | |
|---|---|---|---|
| | Mw/D | Meq $H^+/g$ (pH = 11.0) | $gN/gC \times 10^{+2}$ (ion-exchanged) |
| 1. MAN/AAM/STY (43:47:10) | 3100/3.1 | 8.1 | 10.9 |
| 2. MAN/AAM/STY (43:47:10) | 3600/3.1 | 7.5 | 9.3 |
| 3. MAN/AAM/STY (43:47:10) | 3110/3.4 | — | — |
| 4. MAN/AAM/STY (43:47:10) | 2800/2.3 | — | — |
| 5. MAN/AAM/STY (37:42:20) | — | 7.3 | 8.1 |
| 6. MAN/AAM/STY (30:40:30) | 7850/2.3 | — | — |
| 7. MAN/AAM/STY (30:30:40) | 8000/2.4 | — | — |
| 8. MAN/AAC/STY (50:30:20) | 3610/3.1 | 12.0 | — |
| 9. MAN/AAC/STY (35:35:30) | 4730/3.0 | — | — |

PREPARATIVE EXAMPLE 7

To a 5-liter, 4-neck round bottom flask equipped as in Example 1 was added methyl isobutyl ketone (2.4 kg), powdered maleic anhydride (588.4 g, 6.0 mole), and di-t-butyl peroxide (66.2 g, 0.45 mole). The flask was purged with nitrogen and then heated to reflux. Once at reflux, aliquots of acrylamide ($36\times11.85$ g, 6.0 mole) were added at 5 minute intervals over a three hour period. Once these additions were completed, the thick polymer slurry was heated at reflux for an additional 12 hours. The mixture was cooled to 60° C. and then suction filtered. The copolymer was washed with ether ($2\times200$ ml), filtered, and then dried in vacuo. A white solid (1113.4 g) was obtained in 110% yield.

(Dried copolymer: meq $H^+/g=8.0$ at $pH=11.0$; $gN/gC=15.5\times10^{-2}$; Mw=2350 with D=2.3).

PREPARATIVE EXAMPLE 8

The solid copolymer (15.0 g) of Example 7 was slurried at room temperature in approximately 100 ml of 0.5N NaOH, and then the pH was slowly adjusted to 7 by addition of 50% aqueous NaOH (6 ml). An aqueous copolymer solution was obtained.

Some synthetic process variations for the preparation of maleic copolymers are reported in Table 2.

TABLE 2
COPOLYMER SYNTHESES

| MONOMERS (mole %) | SOLVENT (wt. %) | PROCESS DATA | | | | |
|---|---|---|---|---|---|---|
| | | di-t-Bu$_2$O$_2$ (mole %) | COMONOMER ADD TIME (HR) | POLYMERIZATION TIME (HR) | AQUEOUS HYDROLYSIS TIME (HR) | YIELD |
| 1. MAN/AAM (50:50) | MIBK (68) | 3.7 | 1.0 | 7.0 | — | 90% |
| 2. MAN/AAM (25:75) | MIBK (68) | 3.7 | 1.0 | 7.0 | — | 100% |
| 3. MAN/AAM (75:25) | MIBK (68) | 3.1 | 2.0 | 7.0 | 7 | 111% |
| 4. MAN/AAM | Xylene/MIBK(1:1) | 3.8 | 1.0 | 23 | — | 65% |

TABLE 2-continued

COPOLYMER SYNTHESES

| | | | | | | |
|---|---|---|---|---|---|---|
| (75:25) | (66) | | | | | |
| 5. MAN/AAC (60:40) | MIBK (54) | 10.0 | 3.0 | 4.0 | 2.0 | 119% |
| 6. MAN/MAAC (60:40) | MIBK (54) | 10.0 | 3.0 | 4.0 | 2.0 | 106% |

| | MONOMERS (mole %) | CHARACTERIZATION DATA | | |
|---|---|---|---|---|
| | | Mw/D | Meq H$^+$/g (pH = 11.0) | gN/gC × 10$^{-2}$ |
| 1. | MAN/AAM (50:50) | 4150/4.2 | — | — |
| 2. | MAN/AAM (25:75) | 4195/3.3 | — | 25.0 |
| 3. | MAN/AAM (75:25) | 1900/2.7 | 9.6 | 10.4 |
| 4. | MAN/AAM (75:25) | 1860/2.0 | 9.4 | 9.7 |
| 5. | MAN/AAC (60:40) | 2730/3.1 | 15.4 | — |
| 6. | MAN/MAAC (60:40) | 4400/3.0 | 12.7 | — |

EXAMPLE 9

Preparation of Barite-Weighted Drilling Mud (15 lbs/gal)

To 2.1-liters of distilled water in a Premier Dispersator was slowly added Wyoming bentonite (120 g, Aquagel), Rev. Dust (300 g, Mil-White), barite (2400 g, Baroid), and lignite (24 g, Carbonox) while maintaining a relatively high (30 volts) constant shear rate. The final pH of the mud was adjusted to 10.0–10.5 with 50% (w/w) NaOH. The fluid was aged at least 16 hours in a closed container before use.

EXAMPLE 10

Preparation of Fresh Water/Bentonite Drilling Mud (9.1 lbs/gal)

To 2.1-liters of distilled water in a Premier Dispersator was slowly added Wyoming bentonite (150 g, Aquagel), Rev. Dust (300 g, Mil-White), sodium chloride (1.2 g), and 30 g ferrochrome lignosulfonate (Q-Broxin) in 23 ml of 10N NaOH while maintaining a relatively high (30 volts) constant shear rate. The final pH of the mud was adjusted to 10.0–10.5 with 50% (w/w) NaOH. The fluid was aged at least 16 hours in a closed container before use.

EXAMPLE 11

Preparation of Dispersed Drilling Fluids and Testing

Place 500 ml of a thoroughly mixed, hydrated fluid in a Premier Dispersator and then mix for 2 minutes at high shear (30 volts). Readjust the pH to approximately 10, if required. With stirring, slowly add 2.84 grams of active dispersant (based on the free acid form) to give 2.0 pounds dispersant/barrel mud. Readjust the pH to 10.5 with 1N NaOH and then mix to 6 minutes on Dispersator.

The rheology of the drilling fluids (shear stress versus shear rate plots) was determined from room temperature to the fluid's gelation temperature using a FANN 50C Viscometer.

Table 3 shows the comparative high-temperature performance of the drilling fluids of the present invention with prior art materials using both unweighted and weighted drilling fluids.

TABLE 3

PERFORMANCE OF HYDROLYZED POLYMERS IN DRILLING FLUIDS (2.0 ppb)

| POLYMER | HYDROLYSIS CONDITIONS | Meq H$^+$/g (pH = 11.0) | gN/gC × 10$^{+2}$ | Mw/D | MUD GELATION TEMPERATURE (°F.) | |
|---|---|---|---|---|---|---|
| | | | | | WEIGHTED BARITE | BENTONITE |
| Example 1 | — | 8.1 | 12.9 | 3100/3.1 | — | 400–415 |
| Example 1 | 6 N HCl (3 hr, 35° C.) | 8.8 | 9.1 | — | — | 445 |
| Example 1 | H$_2$O$_2$/OH (3 hr, 25° C.) | | 7.5 | — | — | 410 |
| Example 2 | — | 10.3 | 8.1 | 3000/3.2 | 450 | 450 |
| Example 2 | 0.96 mole NaOH (Reflux 15 hrs) | 8.6 | 8.6 | — | — | 445 |
| Example 2 | 2.40 mole NaOH (Reflux 12 hrs) | 10.9 | 5.6 | 3670/3.9 | — | 445 |
| Example 3 | — | 13.0 | — | 5610/3.5 | 450 | — |
| Example 4 | — | 10.9 | 9.2 | 5610/3.5 | 440 | — |
| Example 5 | — | 9.7 | 7.1 | 3100/3.1 | — | 425 |
| Example 6 | — | 8.5 | 6.7 | 3100/3.1 | — | 428 |
| Example 7 | DOWEX 50W-X8H$^+$ (Reflux 24 hrs) | 9.8 | 8.8 | 2350/2.3 | 445 | — |
| Example 8 | Neutralization | 8.0 | 15.5 | 2350/2.3 | — | 400 |
| Table 1, Sample 2 | | | | — | — | 440 |
| Table 1, Sample 4 | | | | 2800/2.3 | 450 | — |
| Table 1, Sample 5 | | | | — | 445 | — |
| Table 1, Sample 6 | | | | 7850/2.3 | 450 | — |
| Table 1, Sample 9 | Neutralization | | | 4730/3.0 | 400 | — |
| Table 2, Sample 5 | Aqueous | 15.4 | — | 2730/3.1 | 400 | — |
| Table 2, Sample 6 | Aqueous | 12.7 | — | 4400/3.0 | 375 | — |

TABLE 3-continued

| | | PERFORMANCE OF HYDROLYZED POLYMERS IN DRILLING FLUIDS (2.0 ppb) | | | | |
|---|---|---|---|---|---|---|
| | HYDROLYSIS | Meq H$^+$/g | | | MUD GELATION TEMPERATURE (°F.) | |
| POLYMER | CONDITIONS | (pH = 11.0) | gN/gC × 10$^{+2}$ | Mw/D | WEIGHTED BARITE | BENTONITE |
| Prior Art Polymers | | | | | | |
| Ferrochrome Lignosulfonate (5.0 ppb) | | | | | — | 340 |
| Polyacrylic Acid | | | | 4800/2.3 | — | 385 |
| Maleic/Sulfonated Styrene (1:1) Copolymer | | | | 4850/2.9 | 300 | 450 |
| Maleic/Styrene (1:1) Copolymer | | | | 5060/2.7 | 335 | — |

EXAMPLE 12

Maleic anhydride (92.18 g, 0.94 mole) and di-t-butyl peroxide (9.38 g, 0.06 mole) were added to 220 g of methyl isobutyl ketone which was placed in a flask equipped with mechanical stirrer, reflux condenser, and a nitrogen inlet. The flask was purged and maintained under dry nitrogen while the reactants were heated to reflux. Once at reflux, a solution of styrene (21.56 g, 0.21 mole) in glacial acrylic acid (61.25 g, 0.85 mole) was added continuously over 3.8 hours. The yellowish solution was heated at reflux for an additional 0.75 hours and then was cooled to 50° C. With efficient stirring and cooling, concentrated ammonium hydroxide (310 ml, 1,4.6 mole NH$_3$) was added over 10 minutes. Granular solids immediately precipitated and solution started to reflux (temp. ≧90° C.). Once addition was completed, the mixture was heated to reflux and MIBK/H$_2$O azeotrope and excess ammonia were distilled overhead. A light amber polymer solution (482.5 g) was obtained which contained 50% solids. Characterization data on this terpolymer are reported in Table 4, Example 1.

TABLE 4

| Amidation Conditions MAN:AAC:STY (mole %) | pH Final | M$_w$/D | g.N/g.C × 10$^{-2}$ (Ion-Exchanged) | Meq. H$^+$/g. (pH = 11.0) | Mud Gelation Temp. (°F.) (Barite) | (Bentonite) |
|---|---|---|---|---|---|---|
| AMIDATED TERPOLYMERS | | | | | | |
| 1. (47:43:10) Terpolymer NH$_4$OH added to polymer/MIBK Temp. 90° C. | 6.9 | 4540/3.2 | 7.9 | 10.4 | — | — |
| 2. (47:43:10) Terpolymer Polymer/MIBK added to NH$_4$OH Temp. 5-15° C. | 6.6 | 4540/3.2 | 9.0 | 10.0 | — | — |
| 3. (47:43:10) Terpolymer Polymer/MIBK added to NH$_4$OH Temp. 10-60° C. | 6.6 | 3970/3.1 | 8.4 | 10.3 | — | — |
| 4. (43:47:10) Terpolymer Isolated Polymer added to NH$_4$OH Temp. 10-40° C. | — | 5610/3.5 | 9.2 | 10.9 | 440 | — |
| AMIDATED COPOLYMERS | | | | | | |
| 1. MAN/MAAC(60:40) Isolated polymer added to NH$_4$OH Temp. 0-25° C. | 8.7 | 4430/3.8 | 8.7 | — | — | — |
| 2. MAN/AAM(75:25) Isolated polymer added to aqueous taurine solution (pH ~12.5) | 8.5 | 1860/2.0 | 15.3 | 6.4 | — | — |

We claim:
1. A partially amidated terpolymer comprising:
(a) maleic an hydride;
(b) styrene; and
(c) acrylic or methacrylic acid;
wherein the molar ratio of said components (a), (b) and (c) is from about 30:10:60 to about 50:40:10; and
wherein from about 1-42 percent of carboxylic functionality has been converted to amide functionality by treatment with ammonia, ammonium hydroxide or primary or secondary lower alkyl amines having from about 1-5 carbon atoms in each alkyl group;
the weight average molecular weight of said partially amidated terpolymer being from about 500-10,000.
2. The terpolymer of claim 1 wherein said component (C) is acrylic acid and wherein said treatment is with ammonium hydroxide.
3. A partially amidated copolymer comprising:
(a) maleic anhydride;
(b) acrylic or methacrylic acid;
wherein the molar ratio of said components (a), (b) component (b) is from about 25:75 to 75:25; and
wherein from about 0.5-42 percent of carboxylic functionality has been converted to amide functionality by treatment with ammonia, ammonium hydroxide or primary or secondary lower alkyl amines having from about 1-5 carbon atoms in each alkyl group;
the weight average molecular weight of said partially amidated copolymer being from about 500-10,000.
4. The copolymer of claim 3 wherein said component (b) is acrylic acid and wherein said treatment is with ammonium hydroxide.

* * * * *